US009646222B1

(12) United States Patent
Conway et al.

(10) Patent No.: US 9,646,222 B1
(45) Date of Patent: May 9, 2017

(54) TRACKING AND DISTORTING IMAGE REGIONS

(71) Applicant: Google Inc., Mountain View, CA (US)

(72) Inventors: Amanda Conway, San Francisco, CA (US); Matthias Grundmann, San Jose, CA (US); Christian Ingemar Falk, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/628,904

(22) Filed: Feb. 23, 2015

(51) Int. Cl.
*G06K 9/00* (2006.01)
*G06K 9/52* (2006.01)
*G06T 11/60* (2006.01)
*G06K 9/46* (2006.01)

(52) U.S. Cl.
CPC ............... *G06K 9/52* (2013.01); *G06K 9/46* (2013.01); *G06T 11/60* (2013.01); *G06K 2009/4666* (2013.01)

(58) Field of Classification Search
CPC .......................................................... G06K 9/52
See application file for complete search history.

(56) References Cited

U.S. PATENT DOCUMENTS

| | | | | |
|---|---|---|---|---|
| 2006/0227997 A1* | 10/2006 | Au | ............... | G06K 9/00771 382/103 |
| 2011/0129121 A1* | 6/2011 | Corcoran | ........ | G06K 9/00234 382/103 |
| 2012/0093361 A1* | 4/2012 | Huang | ............ | G06T 7/208 382/103 |
| 2012/0116219 A1* | 5/2012 | Miller | ............ | A61B 8/4254 600/438 |
| 2014/0321727 A1* | 10/2014 | Okizaki | .......... | G06K 9/2054 382/131 |
| 2015/0334308 A1* | 11/2015 | Abe | ................. | A61B 5/743 348/77 |
| 2016/0171715 A1* | 6/2016 | Matson | .......... | G06T 3/4053 382/103 |

OTHER PUBLICATIONS

FacePixelizer (NPL: "Privacy Image Editor & Anonymizer" on website www.facepixelizer.com, p. 7).*
Openshot (NPL: "OpenShot Video Editor Manual 1.3.0" p. 5).*
"Kdenlive/Manual/Effects/Blur and hide/Auto Mask", https://userbase.kde.org/Kdenlive/Manual/Effects/Blur_and_hide/Auto_Mask, 6 pages, Nov. 15, 2014.

* cited by examiner

*Primary Examiner* — Oneal R Mistry
(74) *Attorney, Agent, or Firm* — Lowenstein Sandler LLP

(57) ABSTRACT

Systems and methods are disclosed for tracking and distorting regions within a media item. A method includes identifying a region in a first frame of a media item using a first user specified position, calculating based on tracking data an estimated position of the region within a second frame of the media item and an estimated position of the region within a third frame of the media item, adjusting based on user input the estimated position of the region within the second frame to a second user specified position, blending the estimated position within the third frame based on the user specified position of the second frame to generate a blended position within the third frame, and modifying the third frame to distort the region underlying the blended position.

19 Claims, 7 Drawing Sheets

TRACKING AND DISTORTING IMAGE REGIONS

TECHNICAL FIELD

This disclosure relates to image processing, in particular, to tracking and blurring regions in a series of images.

BACKGROUND

Users often upload videos that include regions of personal information, such as license plate numbers or social security numbers, and may prefer the personal information not to be publicly disclosed. In order to avoid such disclosure, a user may be required to modify the video using image editing software prior to uploading the video. The modification may require that the user blur the regions having personal information by manually identifying the regions with personal information in each frame of the video. This process may be time consuming and error prone and may discourage users from sharing videos.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method for tracking and distorting regions within a media item is disclosed. The method includes identifying a region in a first frame of a media item using a first user specified position, calculating based on tracking data an estimated position of the region within a second frame of the media item and an estimated position of the region within a third frame of the media item, adjusting based on user input the estimated position of the region within the second frame to a second user specified position, blending the estimated position within the third frame based on the user specified position of the second frame to generate a blended position within the third frame, and modifying the third frame to distort the region underlying the blended position.

In one implementation, a method further includes the providing a region selector to the user in response to receiving a user request to distort a region, the region selector comprising a shape that can be adjusted by the user to surround the region, wherein the shape is a square and the adjustments comprise resizing, rotating and repositioning the square. In addition, the region selector is displayed at the estimated position within the second frame and adjusting based on user input involves the user dragging the region selector to the second user specified position. The region selector may comprise multiple region selectors for distorting multiple regions within a frame, each of the multiple region selectors being associated with a separate timeline. The region selector is a first color when located at the estimated position within the second frame and is a second color when located at the second user specified position within the second frame.

In another implementation, the blending includes a forward blending and a backward blending, the forward blending comprises blending estimated positions for frames that occur after the second frame, and the backward blending comprising blending the estimated position for frames that occur before the second frame. The forward blending and backward blending each apply to at least 150 frames of the media item. In addition, the first user specified position and the second user specified position are provided by a client computing device, and the blending occurs on a remote computing device.

In other implementations, the method further includes processing a plurality of frames of the media item to generate tracking data, the processing occurring after the media item is uploaded and in response to receiving a user request to modify the media item. The tracking data comprises motion information for a plurality of distinct points within a frame of the media item, the motion information comprising motion vectors originating at a distinct point of the plurality of distinct points and indicating a corresponding point in a previous frame. The tracking data is generated after receiving a request from the user to enable an image editing mode and the tracking data is generated before providing a region selector. The tracking data is generated prior to receiving a user request to enable an image editing mode. In addition, the method further includes providing for display a timeline that indicates a duration of time the media item includes a distorted region, wherein the timeline includes a color to indicate when the distorted region is based on an estimated position and a different color when the distorted region is based on a user specified position.

Computing devices for performing the operations of the above described method and the various implementations described herein are disclosed. Computer-readable media that store instructions for performing operations associated with the above described method and the various implementations described herein are also disclosed. The instructions when executed by a processing device, cause the processing device to execute a method including receiving, from a user, a first user specified position identifying a region in a first frame of a media item, displaying a region selector at an estimated position of the region within a second frame of the media item, the estimated position based on tracking data, adjusting, based on user input, the region selector from the estimated position of the region within the second frame to a second user specified position and blending, by the processing device, the estimated position within a third frame based on the user specified position of the second frame to generate a blended position within the third frame; and modifying the third frame to distort the region underlying the blended position.

BRIEF DESCRIPTION OF THE DRAWINGS

The present disclosure is illustrated by way of example, and not by way of limitation, in the figures of the accompanying drawings, in which.

DETAILED DESCRIPTION

Aspects and implementations of the present disclosure are directed to tracking and distorting regions within image frames of a media item. The disclosure includes a graphical user interface, a tracking algorithm and a blending algorithm. The graphical user interface may enable a user to create one or more region selectors and adjust the region selectors to identify regions within a frame. Each region selector may be a shape such as a square or circle and may be initiated by the user by selecting a location of the frame. Once initiated, the user may adjust the region selector to modify the position, size, shape or orientation of the region selector.

The user may enable a tracking feature that utilizes a tracking algorithm to automatically track the underlying region as the region moves from frame to frame. The tracking algorithm may generate estimated positions by utilizing tracking data, which may be generated prior to identifying the region to be tracked. For example, the tracking data may be produced when the media item is uploaded or when a user initiates an editing mode for the media item. The tracking algorithm may track the region using only the tracking data without performing any subsequent frame-by-frame pixel analysis.

The graphical user interface may display region selectors at the estimated positions determined by the tracking algorithm. In certain situations, the tracking may get lost and the estimated position may drift away from the actual region. This may require the user to manually adjust the position of the region selector to a user specified position to correct the tracking. The underlying system may then utilize a blending algorithm to blend the user specified position with the estimated positions in the previous and subsequent frames. In one example, the blending may include forward and backward linear or exponential blending.

One advantage of the disclosure is that the user may manually adjust the automatic tracking and the user's adjustments will propagate to other frames (e.g., backward). Another advantage is that the tracking data allows for the forward and backward tracking to occur in a computationally efficient manner, for example, without having to perform subsequent frame-by-frame pixel analysis.

Figure 1:
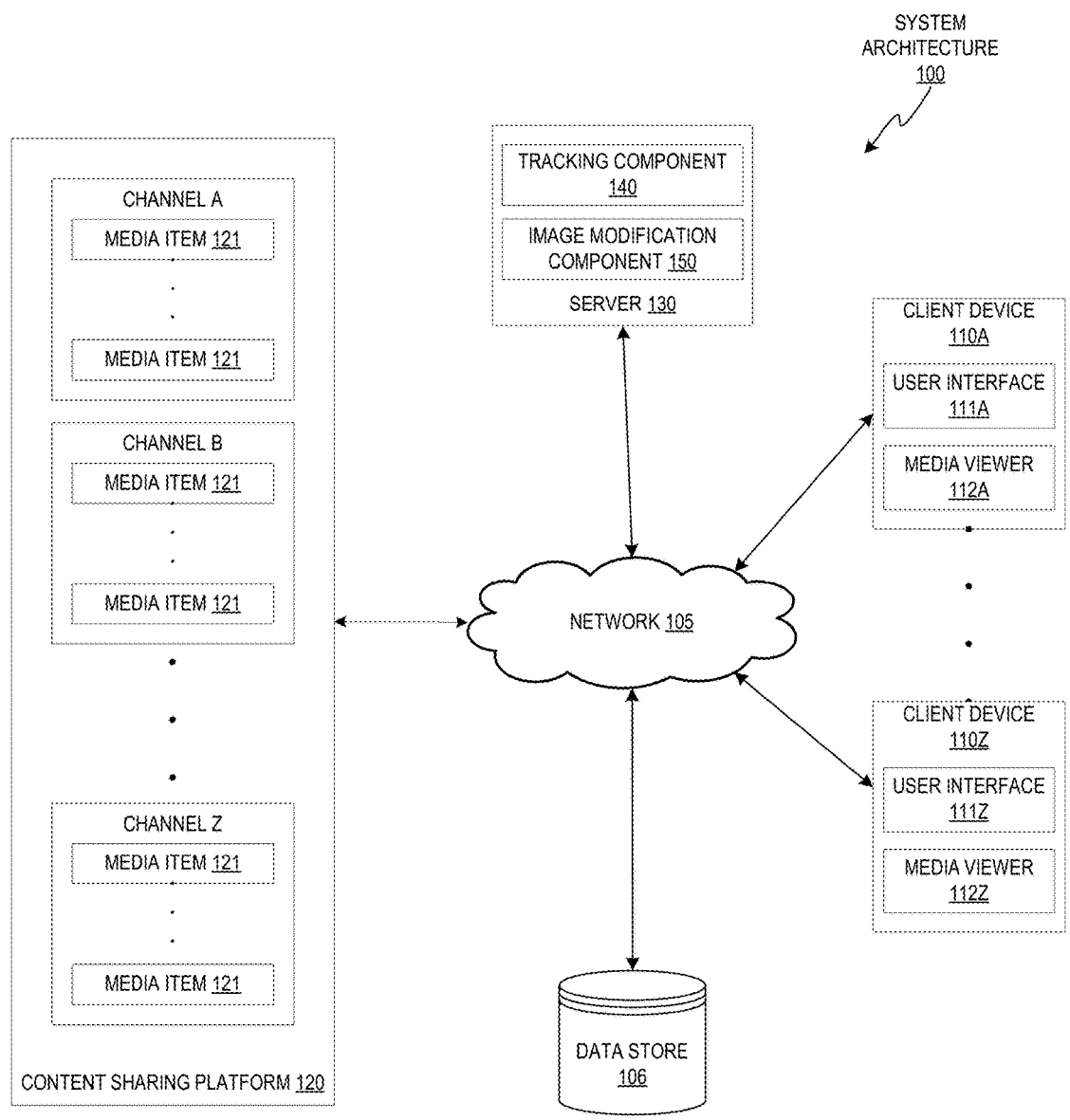
FIG. 1 illustrates an example system architecture in accordance with an implementation of the disclosure.

FIG. 1 illustrates an example system architecture 100, in accordance with an implementation of the disclosure. The system architecture 100 includes a network 105, a data store 106, client devices 110A-110Z, a content sharing platform 120 and a server 130. Each of the various devices of the system architecture 100 may be connected to one another via the network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, server 130 may include tracking component 140 and image modification component 150. Tracking component 140 may be used to process a media item to generate motion data. The motion data may describe the apparent the motion of features between frames. The features may be a set of points (e.g., two-dimensional locations) within the bounds of a frame. The motion data may be used to identify corresponding locations of features in another frame. In one example, the motion data may be in the form of a motion vector that originates at a feature and refers to the corresponding location in a previous frame. In another example, a motion vector may originate at the feature and refer to a corresponding location in a subsequent frame or in both a previous frame and a subsequent frame. An advantage of having motion data that points to a previous frame is that it may avoid analysis of the media item in reverse, which may be more compute intensive than playing the media item in the forward direction since the images may include only the delta from the previous image.

In one implementation, image modification component 150 may be used to identify and distort (e.g., blur) a region within a media item. Image modification component 150 may utilize data produced by tracking component 140 to automatically track the region (e.g., object) as it moves and/or changes throughout the media item. Image modification component 150 may allow the user to manually override the automatic tracking to adjust the estimated position of the region with the actual position of the region (e.g., user specified position).

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and data store 106 may be configured to provide secure storage for private data. The data store 106 may be part of or distributed between any of the client devices 110A-110Z, the content sharing platform 120, and the server 130.

In one implementation, the client devices 110A-110Z may include one or more computing devices such as personal computers (PCs), laptops, mobile phones, smart phones, tablet computers, netbook computers etc. Client devices 110A-110Z may also be referred to as "user devices" or "mobile devices". An individual user may be associated with (e.g., own and/or use) one or more client devices (e.g., one or more of client devices 110A-110Z). Client devices 110A-110Z may each be owned and utilized by different users at different geographical locations.

The client devices 110A-110Z may each implement the user interfaces 111A-111Z, respectively. Each of user interfaces 111A-111Z may allow a user of the respective client device 110A-110Z to adjust a region selector to identify a region of interest within a media item. In one example, one or more of the user interfaces 111A-111Z may be a web browser interface that can access, retrieve, present, and/or navigate content (e.g., web pages such as Hyper Text Markup Language (HTML) pages) provided by the content sharing platform server 120. In one implementation, one or more of the user interfaces 111A-111Z may be a standalone application (e.g., a mobile app), that allows a user of a respective client device 110A-110Z to send and receive information to modify a media item. An example user interface (e.g., a graphical user interface) is described in greater detail with respect to FIG. 6.

Each client device 110A-110Z further includes a media viewer 112A-112Z, respectively. In one implementation, the media viewers 112A-112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content to a user. The media viewer 112A may also display an embedded media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.).

In one implementation, media viewers 112A-112Z may be integrated with user interfaces 111A-111Z and may allow for video to be received from one or more sources and displayed within the respective user interfaces 111A-111Z. For example, client device 110A may receive video data from the content sharing platform 120, which may correspond to video streams generated by one or more additional client devices. The media viewer 112A may generate for display (e.g., within the user interface 111A) video corresponding to each of the video streams based on the received video data.

In one implementation, content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, the content sharing platform 120 can enable the user to edit an uploaded media item 121, which may be associated with one or more channels (e.g., Channel A, Channel B-Z).

Figure 2:
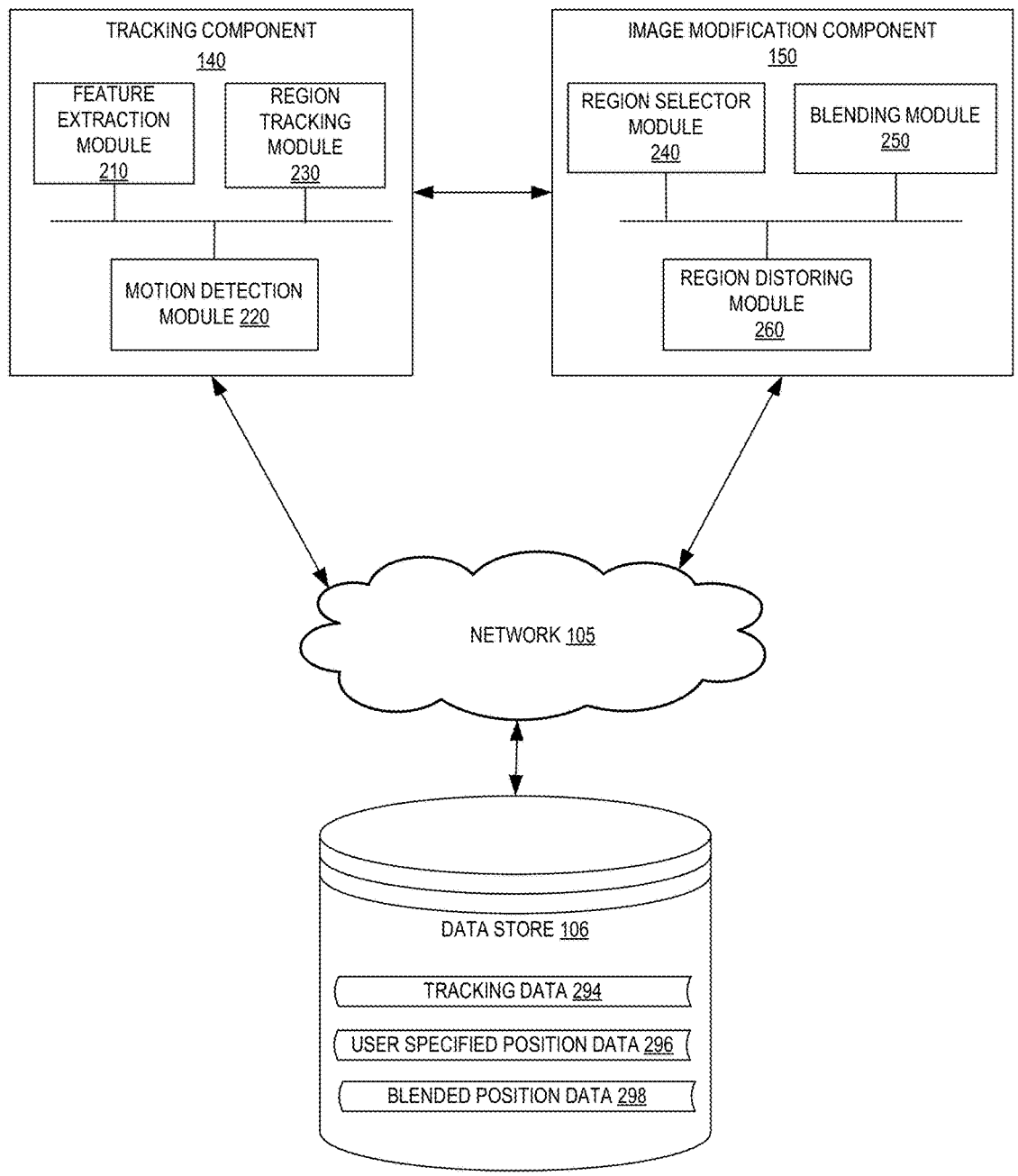
FIG. 2 is a block diagram illustrating a tracking component and an image modification component in accordance with an implementation of the disclosure.

Referring now to FIG. 2, tracking component 140 may include a feature extraction module 210 and a motion detection module 220, which may generate tracking data 294 and store it in data store 106. More or less components or modules may be included without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

Feature extraction module 210 may analyze one or more frames of the media item to detect image features that may be used to determine motion. In one example, features extraction module 210 may identify distinct features (e.g., characteristic points or interest points) based on whether they are a corner by using an algorithm that determines, the minimum eigenvalue of the auto-correlation matrix of image gradients, such as a Harris corner measure. The minimum eigenvalue may be high for pixels that coincide with line junctions (e.g., two lines meet) but may not be high for pixels on the lines themselves. In one example, feature extraction module 210 may identify a pixel or set of pixels as a feature when the pixels corresponding corner measure is above a pre-defined threshold after non-maxima suppression.

Motion detection module 220 may utilize the results of the feature extraction module 210 and may perform additional processing to identify a pattern of apparent motion (e.g., optical flow) of regions, objects, surface, and edges within the visual scene of the media item. Motion detection module 220 may also distinguish amongst different types of motion. A first type of motion may be a result of regions moving within the field of view of a recording device (e.g., object motion). A second type of motion may be the result of movements of the recording device itself (e.g., camera).

Motion detection module 220 may identify motion and distinguish between types of motion by generating one or more motion models to model optical flow (e.g., original camera path). The motion models (e.g., linear motion models) may model the image deformation between adjacent frames using models with increasing degrees of freedom (DOF). A first motion model may be include two degrees of freedom and model translations along an X and Y direction, whereas a second motion model may include four degrees of freedom and involve rigid similarities, translation, rotation and uniform scale. Additional and more complex motion models may be used, such as homographies with eight degrees of freedom that additionally account for perspective effects. In one example, translations are estimated as a weighted average of sparse flow vectors and similarities are solved for using weighted normal equations.

Tracking data 294 may be generated by tracking component 140 and may be stored in data store 106. Tracking data 294 may include data derived from the feature extraction module 210 and the motion detection module 220. In one example, tracking data 294 may describe the motion of features (e.g., distinct locations) from the current frame N to their matching locations in an earlier frame (e.g., previous frame N−1). Tracking data 294 may be a per-frame set of points (2D locations) with each having a motion vector originating at that point and referring to the corresponding location in the previous frame. In another example, tracking data 294 may describe the motion of features from the current frame N to their matching locations in a later frame (e.g., previous frame N+1). Each set of points may have a motion vector originating at that point and referring to the corresponding location in the subsequent frame. In either example, a grid-based version of a differential method for optical flow estimation may be used, such as the Lucas-Kanade method. This may result in a dense coverage of high-quality features even in low textured areas (e.g. sky, snow, road).

Tracking data 294 may include the set of extracted feature points and their respective motion vectors. The motion vectors may be absolute motion vectors or relative motion vectors. An absolute motion vector may describe the motion of an extracted feature point and may take into account both object motion and camera motion. The relative motion vectors may be similar to the absolute motion vector but may remove (e.g., subtract) the camera motion from the motion vector and therefore may include only the object motion. Removing camera motion may be performed using matrix multiplication of the recovered motion model and the feature's location. The relative motion may more closely reflect the motion of a region, which may be used during region tracking.

Tracking data 294 may be stored in chunks of a pre-determined length (e.g., 5 s of video, which at 30 fps corresponds to 150 frames). The chunks enable the client or server perform caching of the tracking data. The system may pre-compute the tracking data and store it either on a server or client. In one example, the actual tracking only leverages the tracking data and does not need the frames of the media item.

Region Tracking Module 230 may utilize the tracking data 294 to track the position of a region as the region appears to move from frame to frame. Tracking module may execute a tracking algorithm that computes the displacement vector for the region forward and backward in time until the media item terminates (e.g., beginning or ending) or the region is determined to no longer be displayed (e.g., hidden, off the screen). In one example, tracking data may store motion vectors based on the previous frame as opposed to a subsequent frame and the tracking algorithm may aggregate the motion vectors within a region selector at a first user specified position and may average the motion vectors to determine an estimated position of the region selector in a prior frame. This may be provide backward tracking because the tracking data stores motion vectors to the previous frame. A similar method may be performed for forward tracking by inverting the motion vector (e.g. location and vector are reversed). The tracking algorithm may aggregate the inverted motion vectors within the region selector at a first user specified position and may average the inverted motion vectors to determine a subsequent estimated position of the region selector. The tracking algorithm will be discussed in more detail in regards to FIG. 5.

Tracking component 140 may utilize parallel processing for generating tracking data 294. The parallel processing may involve parallel processing across multiple processing devices of a single computer system (e.g., multi-processing, multi-threading). The parallel computing may also involve parallel processing across multiple computer systems in a distributed manner (e.g., distributed processing, grid processing). In one example, the algorithm for determining the tracking data may require a target frame and an alternative frame (e.g., previous frame or subsequent frame) and each target frame may be separated into its own job to be performed using parallel processing.

As shown in FIG. 2, image modification component 150 may include a region selector module 240, a blending module 250, and a region distorting module 260, which may store user specified position data 296 and blended position data 298 within data store 106.

Region selector module 240 may include a graphical interface that presents one or more region selectors to a user and allows a user to adjust a region selector to identify a region within the media item. In one example, a region selector may be a shape, such as a square, circle, triangle or other similar shape. In another example, the shape may be drawn by a user by selecting one or more points of the frame or clicking and dragging. The shape may be adjusted by the user. The adjustments may include resizing, rotating and repositioning the shape so that it surrounds or includes a region that the user would like to modify.

The region selectors may be adjusted by the user to enable the input of multiple user specified positions. Each user specified position may correspond to the position of the region selector in a different frame of the media item. A user specified position may include a change to the x-y position but may also or alternatively include a modification of the size, shape, rotation or other adjustment to the region selector. A first user specified position may be used to identify a region of a media item that the user would like to distort. Subsequent user specified positions (e.g., second user specified position in a subsequent frame) may be used to adjust the automatic tracking. In one example, tracking component 140 may provide an estimated position of the region in a subsequent frame and image modification component 150 may overly a region selector at the estimated position. Under certain situations, the tracking component may not accurately estimate the position of the region, for example a license plate may be blocked in multiple frames and appear in a later frame at a position different from the estimated position. The user may then manually adjust the position of the region selector within a frame to a user specified position to more closely reflect the actual position of the region. The user specified positions may be stored in data store 106 as user specified position data 296.

Blending Module 250 may blend the estimated position generated by the tracking component with one or more user specified positions to more closely track the region. This may be advantageous because the user may manually modify the auto tracking position at a specific frame and the manual modification (e.g., user specified position data 296) may be blended with other frames without additional user intervention. In one example, blending module 250 may be capable of forward blending and backward blending from a specified frame. Forward blending may involve blending user specified position data 296 with frames that occur after the specified frame, whereas backward blending may involve blending the user specified position data 296 with frames that occur before the specified frame.

Blending module 250 may blend multiple user specified positions with multiple estimated positions using a blending algorithm. The blending algorithm may take as input the user specified positions and estimated paths between the user specified positions. The estimated paths (e.g., auto tracking paths) may be derived by re-executing the tracking algorithm (e.g., forward tracking and backward tracking) using the user specified positions. As a result, there may be both a forward tracking estimated path and backward tracking estimated path that may overlap between the frames with user specified positions. The forward tracking estimated path may be based on a user specified position in an earlier frame and the backward tracking estimated path may be based on a user specified position in a later frame. The blending algorithm may blend the forward and backward tracking estimated paths derived by the user specified positions with one another or with the original estimated positions to produce blended paths. The blending algorithm may perform the blending by executing the following two steps: (1) for every user specified position track backwards and forwards until a termination is encountered. The termination may occur because the tracking is lost, the tracking reaches another frame with a user specified position, the tracking is manually ended by the user, or the media item's beginning or end has been reached. (2) Another step involves blending the paths between two user specified positions using a blending function (e.g., linear or exponential).

In one implementation, the blending algorithm may take as input an interval of positions (e.g., [t_l, t_u]) generated by the tracking algorithm. At some point "s" within the interval [t_l, t_u] the user may adjust the position of the region selector. This may cause the blending algorithm to compute a new interval [s_l, s_u]. In this case, it may be necessary to blend the two paths into one track as follows: (1) For times smaller than t, we use the track computed within the interval [t_l, t]; (2) For times larger than s, we use the track computed within the interval [s, s_u]; (3) For times in the interval [t, s], we have two path's one originating from t in the forward direction (referred to as P_t) and one originating from s in the backward direction (referred to as P_s). The two paths are for each time i in [t, s] may be linearly combined into one single path P using the following equation: $P(i)=(i-t)/(s-t)*P\_s(i)+(s-i)/(s-t)*P\_t(i)$.

Region distorting module 260 may utilize the position data received from region selector module 240 and blending module 250 to identify a portion of the media item to distort. Region distorting module 260 may distort a region by blurring, censoring (e.g., black out or overlying another image), cropping or performing other similar image modifications. Region distorting module 260 may distort a region of a media item by modifying the portion of a frame underlying the region selector. The position of the region selector may be based on a user specified position, an estimated position or a blended position depending on which frame of the media item is being modified. When multiple positions are available for a single frame the region distorting may select a position based on the following selection mechanism: 1) select the user specified position of the region selector when present for the current frame; 2) select the blended position when no user specified position exists for the current frame; 3) select the estimated position (e.g., auto tracking) when neither a user specified position nor a blended position exists for the frame; 4) select the position in the closest adjacent frame that satisfies any of the above 3 options.

In general, functions described in one implementation as being performed by any of content sharing platform 120 or server 130 may be performed by one or more client devices 110A-110Z in other implementations if appropriate. For example, the client device 110A may implement a software application that performs the functions of tracking component 140 and/or image modification component 150. The functionality attributed to a particular component can be performed by different or multiple components operating together. In addition, any functions described with respect to tracing component 140 and/or image modification component 150 that "receive", "transmit", "retrieve", "identify", "determine", etc., are understood to refer to functions performed by sub-systems or sub-modules within the processing device rather than across a network (e.g., the network 105).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
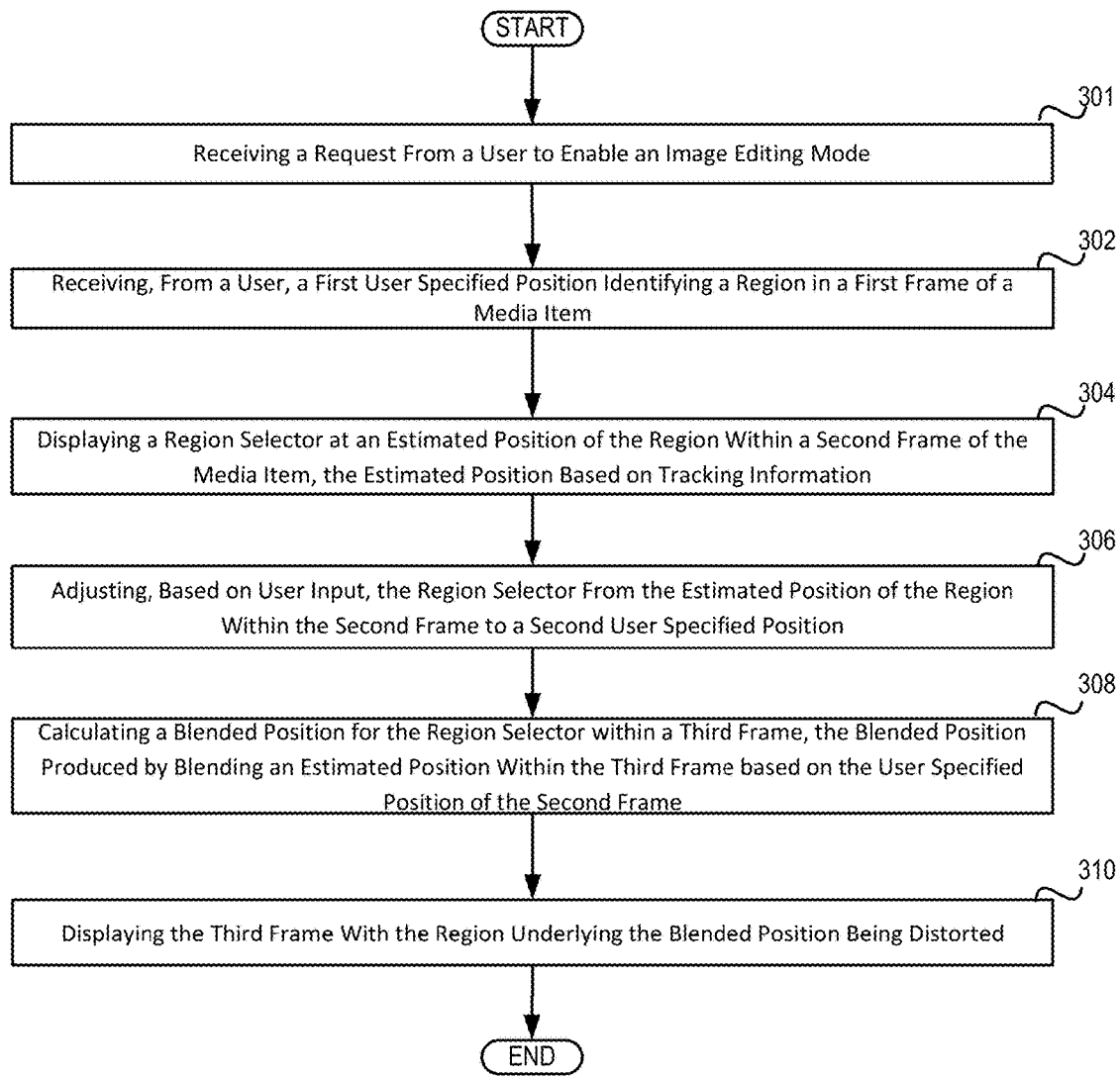
FIG. 3 is a flow diagram illustrating a method for a user to identify a region within a media item and adjust a region selector to track the region, in accordance with an implementation of the disclosure.
Figure 4:
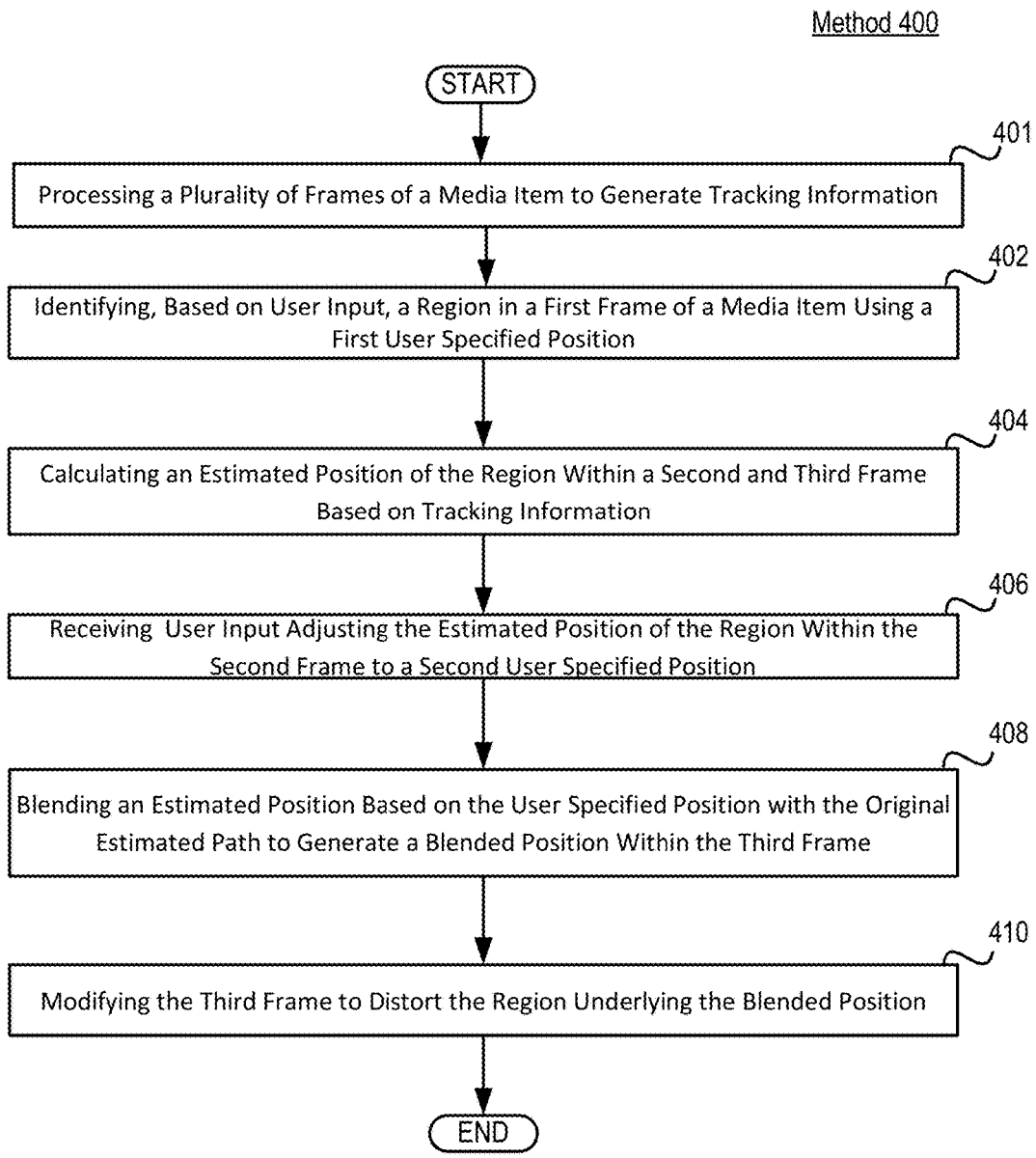
FIG. 4 is a flow diagram illustrating a method for tracking a region and blending region selector positions throughout a media item, in accordance with an implementation of the disclosure.

FIG. 3 and FIG. 4 include flow diagrams illustrating example methods 300 and 400, respectively. Method 300 may execute on a client computing device and may allow a user to identify a region within a media item to be tracked and distorted in accordance with an implementation of the disclosure. Method 400 may execute on a server computing device and may track a specified region and blend the region's position within a media item in accordance with an implementation of the disclosure. Methods 300 and 400 may be performed by processing logic that includes hardware (e.g., circuitry, dedicated logic, programmable logic, microcode, etc.), software (e.g., instructions run on a processing device to perform hardware simulation), or a combination thereof. Throughout method 300 and 400 the terms first frame, second frame, and third frame are used to refer to frames of a media item, however the first frame does not necessarily indicate it is the beginning of the media item nor does the second frame and third frame necessarily indicate they are immediately adjacent to the beginning of the media item.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, method 300 may be performed by image modification component 150 as described with respect to FIGS. 1 and 2. In some implementations, method 300 may be performed by client devices 110A-110Z as described with respect to FIG. 1. Method 300 may begin at block 301 when client processing logic receives a request from a user to enable an image editing mode. In one example, the user may be presented with a media item and there may be a selectable button near (e.g., below) the media item. When the user selects or clicks the button a user request may be initiated, at which point the user may be presented a graphic user interface with image editing tools. The graphical user interface may include one or more region selectors and a way to activate a region tracking feature, which are discussed in more detail with respect to FIG. 6.

At block 302, the client processing logic may receive from the user a first user specified position identifying a region in a first frame of a media item. The first frame may be any frame of a media item and is not necessarily the initial frame of the media item. In one example, the user may specify a position by initiating a region selector and moving it to a first user specified position. The user may activate the region tracking feature, which may automatically generate another region selector or re-position the existing region selector to follow the region and accommodate for motion (e.g., object motion, camera motion).

At block 304, the client processing logic may display a region selector at an estimated position of the region within a second frame of the media item. The estimated position of the region selector may be based on tracking data. The second frame may be any other frame within the media item and may be before or after the first frame.

At block 306, the client processing logic may adjust, based on user input, the region selector from the estimated position of the region within the second frame to a second user specified position. In one example, the graphical user interface may present the second frame of the media item and may superimpose a region selector at the estimated position of the region. Under certain circumstances, the estimated position may not overly the actual position of the region and the user may wish to manually override the location of the region selector to identify the correct position of the region. In one example, a user may accomplish this by selecting the region selector within the second frame and dragging it to a second user specified position, which may more closely overly the region. In another example, the user may select to the correct position of the region without dragging the region selector by clicking, scrolling, navigating or providing other similar input (e.g., coordinates) to the graphical user interface.

At block 308, the client processing logic may calculate a blended position for the region selector within a third frame of the media item. The blended position may be calculated by blending the estimated position within the third frame with the user specified position of the second frame using the blending algorithm. The client processing logic may then display the region selector at the blended position. In one example, the client processing logic may display the region selector at only the blended position within the third frame without showing the region selector at the estimated position within the third frame. In another example, the client processing logic may display a region selector at the blended position and another region selector at the estimated position and may modify the display of either or both region selectors to allow the user to distinguish between them. The modification may be based on color (e.g., green, red, orange, blue), motion (e.g., flashing, shaking), pattern (e.g., dash, dotted) or texture. For example, the region selector at the blended position may be one color and the region selector at the estimated position may be a different color.

At block 310, the client processing logic may display the third frame with the portion of the frame underlying the region selector distorted. The distortion may also be applied to multiple other frames of the media item.

Referring to FIG. 4, method 400 may begin at block 401 wherein server processing logic may process a plurality of frames (e.g., first frame, second frame, third frame) of a media item to generate tracking data. The tracking data may include motion data that describes the optical flow of distinct features within the media item. The tracking data may be generated at a variety of different times. In one example, the tracking data may be generated in response to the media item being uploaded to content sharing server 120. In another example, the tracking data may not be generated until the server receives a request to modify the media item. In yet another example, the tracking data may not be generated until the user identifies a region and activates the auto tracking feature. In this later example, the tracking data may be temporarily stored in cache without being stored in any persistent storage.

At block 402, the server processing logic may identify based on user input a region in a first frame of a media item using a first user specified position. As discussed earlier, this may be based on the user's positioning of a region selector. In one example, the server processing logic may receive user input from client processing logic in the form of a series of coordinates and dimensions pertaining to the final location of the region selector.

At block 404, the server processing logic may calculate an estimated position of the region within a plurality of frames (e.g., second frame and third frame) based on the tracking data. In one example, the estimated position may be based on a tracking algorithm that aggregates motion data from points within the region selector to determine where those points would lie in another frame (e.g., subsequent or prior frame).

At block 406, the server processing logic may receive user input adjusting the estimated position of the region within the second frame to a second user specified position. The adjustments may include user modifications of the region selector, which may result in the region selector more closely corresponding to the identified region. In one example, the server processing logic may receive the second user specified position (e.g., coordinates). In another example, the server processing logic may receive one or more adjustments (e.g., up 40 pixels and right 60 pixels, 45° rotation, 20% size increase) which may be used to derive the second user specified position.

At block 408, the server processing logic may blend the estimated position of the third frame with the user specified position of the second frame to generate a blended position within the third frame. The blending of the positions may be performed by using a blending algorithm (e.g., linear equation or exponential equation) to merge the user modifications with the estimated positions determined via an auto-tracking feature. In one example, a linear equation may be applied to multiple image frames before and after the frame that includes the user specified position. As discussed above, the blending may also or alternatively be performed using the client processing logic.

At block 410, the server processing logic may modify the third frame to distort the region underlying the blended position. The distortion may involve applying a blurring mask over the area covered by the region selector when at the blended position.

Figure 5:
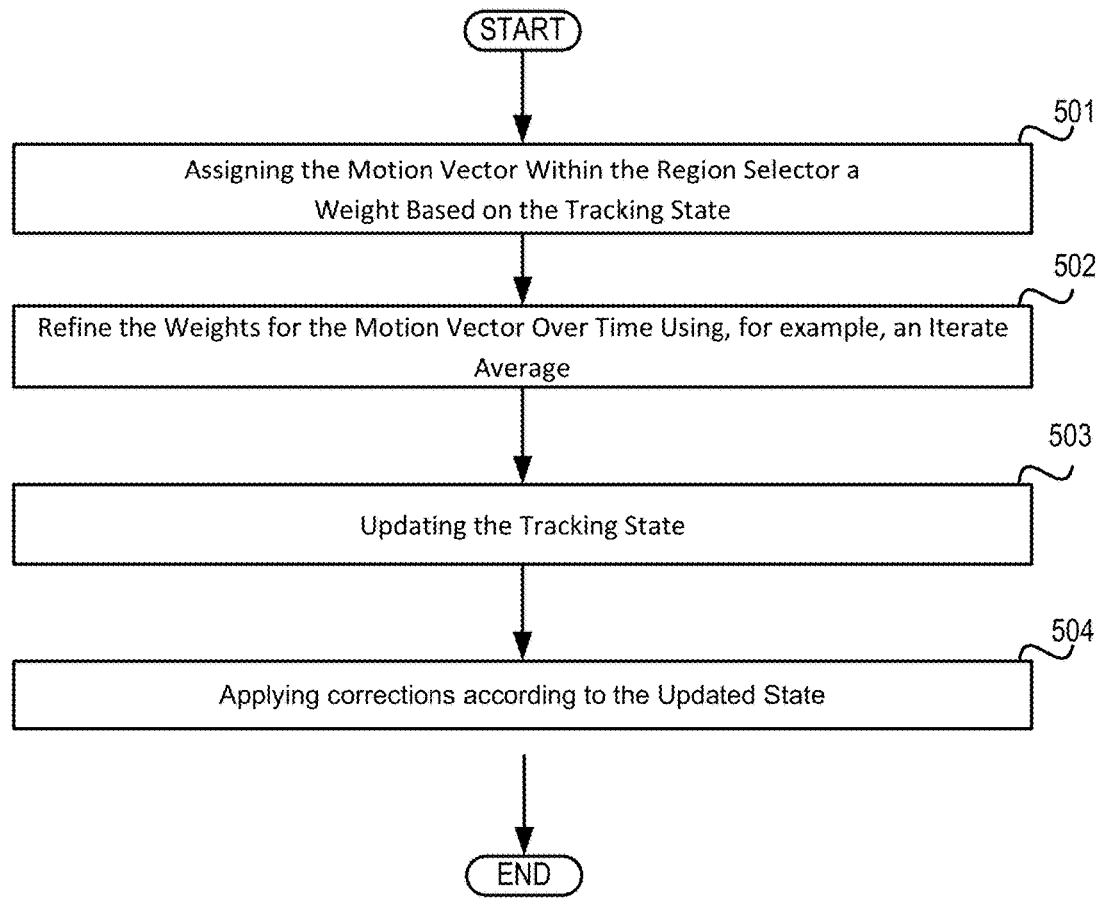
FIG. 5 is a flow diagram illustrating a method for utilizing tracking data to track a region's position throughout a media item, in accordance with an implementation of the disclosure.

FIG. 5 is a flow diagram illustrating a method 500 for utilizing tracking data to track a region's estimated position throughout frames of a media item, in accordance with an implementation of the disclosure. In the following discussion, a feature's 2 dimensional position is denoted as f_i and its corresponding vector as v_i. When a vector of a tracking feature within a region selector, the tracking algorithm may utilize feature points from a slightly enlarged region to facilitate better tracking. For example, a user might select a face of a person, without including the person's hair or upper body yet the tracking algorithm may utilize feature points of the hair and upper body to increase tracking quality.

Each motion vector of a feature point may be associated with a weight, which may result in the aggregation of vectors being non-uniform. The weighting may affect how much the motion vectors contributes to the final displacement vector for the region. Weighted motion vectors can be classified into inlier motion vectors and outlier motion vectors. Inlier motion vectors are typically weighted higher than the outlier motion vectors and may therefore provide a larger contribution to the final displacement vector. Outlier motion vectors are those motion vectors that have a comparably lower weight and therefore provide a smaller contribution to the final displacement vector. In one example, the aggregation of vectors may be based on the following equation: $[\sum_i v\_i \cdot w\_i]$ wherein, v_i is a particular vector that is associated with the user specified region and w_i is the weight per vector.

Each region may be associated with a tracking state and the tracking state may be based on a variety of characteristics of the region, such as how fast it is moving throughout the frames or how much it is transforming (e.g., hair in wind). Analyzing and storing the tracking state may be advantageous because it may allow the region to be tracked through difficult settings, such as visual occlusions that fully or partially block the region or articulated objects that change appearance frequently (e.g. someone running, face/hair in the wind).

The tracking state may be based on the following criteria: (a) current velocity; (b) kinetic energy; (c) inlier center; (d) motion disparity; (e) background discrimination, (f) prior weight. The current velocity of the region may be based on the foreground motion for each vector and may exclude the camera motion for each vector. This may be used to measure how consistent the estimated motion is over time.

The kinetic energy may be the average of the magnitude of vectors with significant motion within the box. This is different from the velocity, which could be small in case the vectors directions are uncorrelated (point in random directions), however if their magnitude/length is large, it will be captured by a large kinetic energy.

The inlier center may be the average location of all inlier vectors. This may be used to determine the approximate center of motion of the region that is being tracked. The center of motion of the region may not necessarily coincide with the center of the region or center of the region selector. This may be useful for measuring and addressing tracking drift, which occurs when an estimated position of the region drifts from the actual position of the region.

Motion disparity may indicate how compatible the estimated motion (e.g., estimated position) in the previous frame is when compared to the previous estimate. In one example, only foreground motion may be used and the range of values may be from 0 to 1. A value of zero may indicate the motion is not compatible, at which point the tracking algorithm may determine it has lost the tracking or that the region is no longer within the frame (e.g., hidden, off screen). A value of one may indicate the motion agrees with the previous prediction within some error range. For example, a vehicle driving along the positive x-axis may be suddenly occluded by a static object and the estimated motion may change from a large motion in x, to effectively zero. The tracking algorithm may utilize physical characteristics (e.g., inertia) to determine that the tracking is lost because assuming elastic collisions it may not be physically plausible for the tracking to switch that rapidly. However, the tracking algorithm may recover the vehicle somewhere along its current trajectory in a subsequent frame.

Background discrimination may indicate how well the motion can be distinguished from background motion (e.g., object motion vs. camera motion). In one example, background discrimination may be measured with a value within a range of 0 to 1. If the difference is large (value=1), the tracking algorithm may be able to distinguish features that are part of an object's motion from those that are part of the background or camera. The tracking algorithm may consider all feature points within a region selector since the tracking algorithm may not be able to determine a priori weather an object is located within the region selector. This makes previous state attributes as the inlier center reliable estimates. If the difference is small (value=0), we cannot distinguish object features from background features and measures such as the inlier center become unreliable.

Prior weight may indicate how much the tracking algorithm has changed between iterations of the analysis. For example, after tracking the region successfully for a few frames the tracking algorithm may form a reasonable belief about the tracking state. For the first few frames the prior weights and motion models may not reliable but may become more reliable after analyzing more frames.

As shown in FIG. 5, the tracking algorithm may begin at block 501, where the processing logic (e.g., server or client) may assign the motion vectors within the region selector a prior weight $w\_i$ based on the tracking state. Each motion vector may be given a prior weight based on the below measures. The tracking algorithm may calculate a weight $w\_i$ by multiplying the below measures. For example, the initial weight $w\_i$ for a motion vector may be determined by multiplying the following: to yield the initial weight $w\_i$ for each motion vector. (a) special location measure; (b) a similarity measure; and (c) a magnitude measure.

The spatial location measure may be based on the special location of the motion vector within the rectangle. This is expressed as a spatial Gaussian with more weight given to vectors within the center of the region selector. The similarity measure, which may be based on the motion vector's magnitude compared with the previous motion vector magnitude. Motion vectors that are similar to the previously estimated motion vector are given a higher weight. The magnitude measure may be based on the motion vector's kinetic energy. A higher kinetic energy yields a higher magnitude measure and may be preferred.

In one example, the tracking algorithm may emphasize the similarity measure and may increase the value of the similarity measure when tracking is deemed to be lost (i.e. motion disparity is high). When tracking is repeatedly deemed to be lost (i.e. motion disparity is consistently high over time (e.g. 1 s of video), the box may be considered untraceable. This may allow the tracking algorithm to automatically terminate tracking when, for example, there is long-term occlusions or if the region leaves the image frame (e.g. a car traveling outside the recording area).

At block 502, the tracking algorithm may refine the weights for each motion vector over time using, for example, iterative re-weighed least squares. The iterative re-reweighted least squares may be performed using N iterations to compute the displacement vector of the region as weighted average as discussed above. Each vector may be re-weighted based on its residual value with respect to the estimated displacement vector d. In particular the weight is updated based on, for example, the inverse norm of the residual (e.g., $w\_i = 1/|v\_i - d\_i|$). Motion vectors agreeing with the estimated displacement vector d are given a high weight, whereas motion vectors that do not agree are given a low weight.

At block 503, the tracking algorithm may update the tracking state based on the estimated object motion and the refined weights $w\_i$. The tracking algorithm may also update the inlier center to be a weighted average of the feature locations $f\_i$ with their corresponding weight $w\_i$ (e.g., \sum\_i f\_i*w\_i). In one example, the prior weight may be increased in increments of 0.2, however other values such as, 0.1, 0.5, 0.02, or other similar values may be used. The tracking algorithm may also compute a new motion disparity and a new background discrimination value based on the new object motion vector computed in block 502.

At block 504, the tracking algorithm may apply corrections to account for tracking drift. In one example, the initial weight assigned to the motion vector in block 501 may be biased for each feature point (e.g., motion vector) based on its distance from the center of the region selector. In another example, the tracking algorithm may select multiple (e.g., all) inliers based on the motion vectors final weight in block 502.

The tracking algorithm may also compute the average location of all the inlier motion vectors in an adjacent frame (e.g., subsequent or previous frame). The tracking algorithm may apply a spring force from the region selector's estimated future position to the average location of all the inliers. In one example, the spring force may only apply if the distance between the estimated position and the average location is beyond a threshold value (e.g., over 50% displacement). In this case, the spring force may be scaled in proportion to the difference. The use of the spring force may be advantageous because it may reduce or avoid numerical instabilities and errors in historical tracking data that may accumulate and result in the tracking being lost (e.g., incorrectly terminating).

Figure 6:
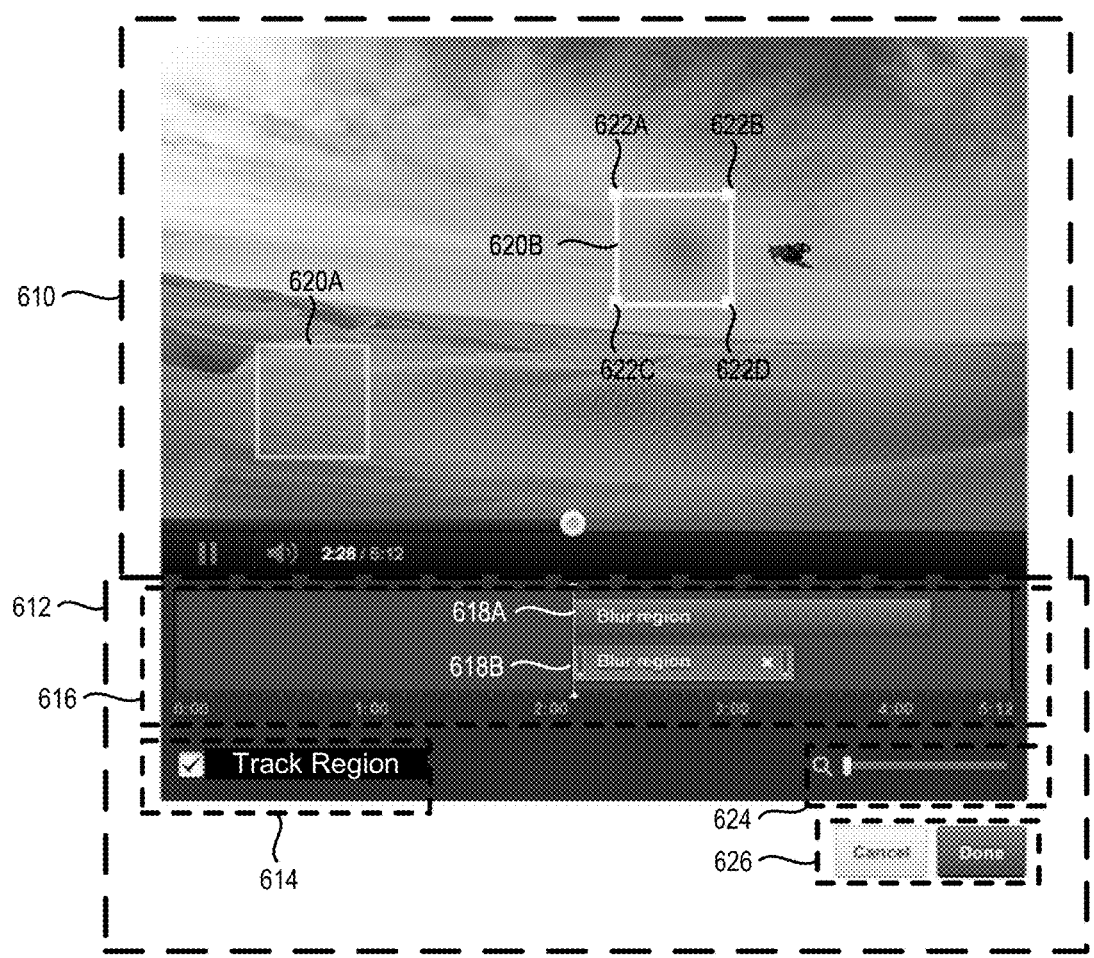
FIG. 6 is an example graphical user interface for tracking and blurring a region within a media item, in accordance with an implementation of the disclosure.

FIG. 6 is a diagram illustrating an exemplary graphical user interface (GUI) 600 for tracking and blurring a region within a media item, in accordance with an implementation of the disclosure. GUI 600 may be embedded within a web browser, part of an application running on a mobile or non-mobile device.

In one example, the GUI 600 may include a media viewer region 610, modification region 612, tracking enablement region 614, timeline region 616, time bars 618A and 618B and region selectors 620A and 620B.

Media viewer region 610 may be an area that is capable of presenting a media item, such as for example a video player. Media viewer region 610 may include one or more region selectors 620A and 620B. As shown, region selectors 620A and 620B may be squares however they may be any shape such as a circle, triangle or user drawn shape. Each region selector may be individually selected and adjusted to modify the position, shape, size, orientation, or other similar attribute of the region selector. When a user selects a region selector the region selectors appearance may be altered to include selection indicia. For example, region selector 620B may include selection indicia 622A-D which may modify the standard region selector shape (e.g., 620A).

Region selectors 620A and 620B may be adjusted or created based on user input. The user input may include, for example, a click, tap or other input via a mouse or user gesture and may be used to identify a position or location (e.g., x-y coordinates) within a frame of the media item. For example, a region selector may be adjusted when the user input location is within the bounds of an existing region selector or in close proximity to an existing region selector. An new region selector may be created when the user input location does not include an existing region selector or the user input location is not near the approximate location of the region selector.

Modification region 612 may include tracking enablement region 614, timeline region 616, zoom region 624 and completion region 626. Timeline region 616 may be used to visually represent the portion of the media item that includes region selectors. Each region selector may correspond to a time bar, for example region selector 620A corresponds to time bar 618A and region selector 620B corresponds to time bar 618B. Multiple time bars may be stacked vertically as shown, which may indicate multiple region selectors exist in the same frame (e.g., blurring multiple different regions of a frame). The horizontal length of the time bar may indicate the quantity of frames (e.g., duration of time) that the region selector is present and therefore may represent, for example, the duration of time the region is distorted. The beginning of time bar 618A (e.g., left most end) may indicate the first frame that includes the corresponding region selector and the end of the time bar (e.g., right most end) may indicate the last frame to include the region selector.

Time bar 618A and 618B may include multiple colors to indicate aspects of the corresponding region selector. Different colors may be used to indicate the various mechanism for determining the position of the region selector, for example, a region selector may be determined based on user input (e.g., user specified position), based on tracking data (e.g., estimated position) or a blend of user input and tracking data (e.g., blended position). Each one of these may correspond to a different color and the color may be used to alter the appearance of the time bar to illustrate which frames correspond to which determination method. In another example, the region selectors may also be color coordinated based on how the position was determined and when a region selector in an estimated or blended position is adjusted by the user the region selector may change colors.

When a time bar is selected (e.g., 618B) its corresponding region selector (e.g., 620B) may also be selected, and vice versa. As shown in GUI 600, time bar 618A is not currently selected and time bar 618B is currently selected. Once the time bar is selected, its appearance may be altered to include a deletion symbol (e.g., "x") and modification handles at the approximate ends of the time bar. This may allow the user to remove or adjust which frames include region selectors.

Tracking enablement region 614 may allow a user to enable auto tracking so that the region selector follows the region as its position is modified between frames. In one example, the track enablement region may include a checkbox and when the box is checked the auto tracking features (e.g., estimated positions) are used to update the position of the region selector. When the box is not checked the tracking feature may be disabled and the regions selector may stay in the same position with respect to the media viewer region 610.

Zoom region 624 may allow a user to adjust the zoom level of time line region 616. This may be advantageous because it may provide a more detailed view to allow the user to better adjust time bars 618A and 619B to modify the duration of time or quantity of frames that the user intends to distort. In one example, zoom region 624 may include a slider which adjusts the zoom level as the slider button is moved from one end to another (e.g., as it is moved right it becomes zoomed-in or zooms-out). In another example, zoom region 624 may include individual buttons for zooming in and zooming out.

Figure 7:
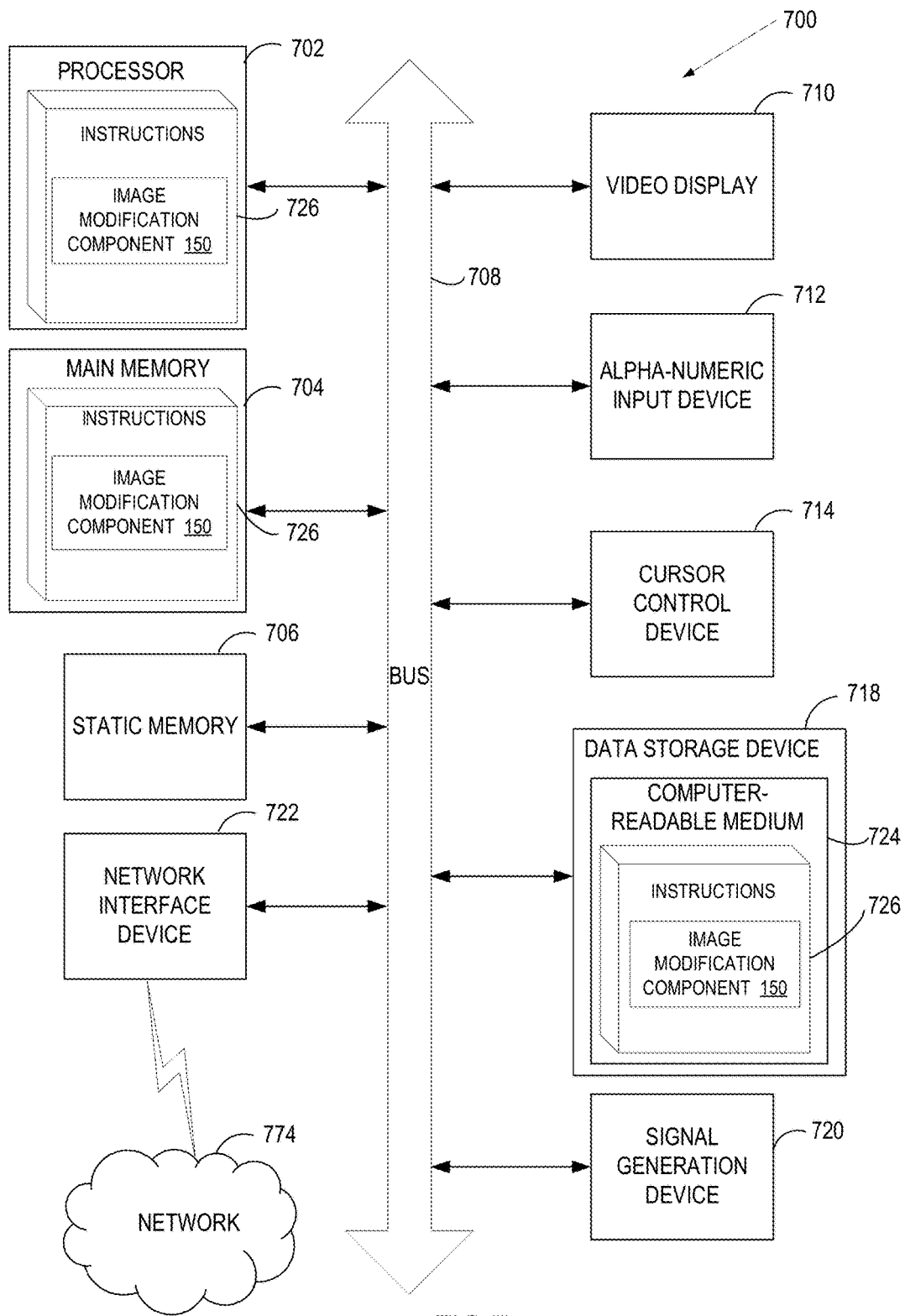
FIG. 7 is a block diagram illustrating an exemplary computer system in accordance with an implementation of the disclosure.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 700 may be utilized by or illustrative of one or more of the client devices 110A-110Z, the data store 106, the content sharing platform 120 or the server 130.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a DSP, network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 (e.g., the network 105) via the network interface device 722.

In one implementation, the instructions 726 include instructions for one or more image modification components 150, which may correspond to the identically-named counterpart described with respect to FIGS. 1 and 2. While the computer-readable storage medium 724 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory computer-readable storage medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "causing", "adding", "subtracting", "inserting", "including", "removing", "extracting", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a region in a first frame of a media item using a first user specified position;
   calculating, based on the first user specified position and on tracking data, an estimated position of the region within a second frame of the media item and an estimated position of the region within a third frame of the media item;
   adjusting, based on user input, the estimated position of the region within the second frame to a second user specified position indicated by the user input;
   blending, by a processing device, the estimated position within the third frame based on the second user specified position of the second frame to generate a blended position within the third frame; and
   modifying the third frame to distort the region underlying the blended position.

2. The method of claim 1 further comprising: providing a region selector to a user in response to receiving a user request to distort a region, the region selector comprising a shape that can be adjusted by the user to surround the region, wherein the shape is a square and the adjustments comprise resizing, rotating and repositioning the square.

3. The method of claim 2, wherein the region selector is displayed at the estimated position within the second frame and the adjusting based on user input comprises the user dragging the region selector to the second user specified position.

4. The method of claim 1, wherein the blending includes a forward blending and a backward blending, the forward blending comprises blending estimated positions for frames that occur after the second frame, and the backward blending comprising blending the estimated position for frames that occur before the second frame.

5. The method of claim 4, wherein the forward blending and backward blending each apply to at least 150 frames of the media item.

6. The method of claim 1, wherein the first user specified position and the second user specified position are provided by a client computing device, and the blending occurs on a remote computing device.

7. The method of claim 1, further comprising:
   providing for display a timeline that indicates a duration of time the media item includes a distorted region, wherein the timeline includes a color to indicate when the distorted region is based on an estimated position and a different color when the distorted region is based on a user specified position.

8. The method of claim 2, wherein the region selector may comprise multiple region selectors for distorting multiple regions within a frame, each of the multiple region selectors being associated with a separate timeline.

9. The method of claim 2, wherein the region selector is a color when located at the estimated position within the second frame and is a different color when located at the second user specified position within the second frame.

10. The method of claim 1 further comprising, processing a plurality of frames of the media item to generate tracking data, the processing occurring after the media item is uploaded and in response to receiving a user request to modify the media item.

11. The method of claim 1, wherein the tracking data comprises motion information for a plurality of distinct points within a frame of the media item, the motion information comprising motion vectors originating at a distinct point of the plurality of distinct points and indicating a corresponding point in a previous frame.

12. The method of claim 1, wherein the tracking data is generated after receiving a request from the user to enable an image editing mode and the tracking data is generated before providing a region selector.

13. The method of claim 1, wherein all of the tracking data is generated prior to receiving a user request to enable an image editing mode.

14. A non-transitory computer-readable storage medium having instructions stored thereon that, when executed by a processing device, cause the processing device to perform operations comprising:
   receiving, from a user, a first user specified position identifying a region in a first frame of a media item;
   displaying a region selector at an estimated position of the region within a second frame of the media item, the estimated position based on the first user specified position and on tracking data;
   adjusting, based on user input, the region selector from the estimated position of the region within the second frame to a second user specified position indicated by the user input;
   blending, by the processing device, the estimated position within a third frame based on the second user specified position of the second frame to generate a blended position within the third frame; and
   modifying the third frame to distort the region underlying the blended position.

15. The non-transitory computer-readable storage medium of claim 14 further comprising: providing a region selector to a user in response to receiving a user request to distort a region, the region selector comprising a shape that can be adjusted by the user to surround the region, wherein the shape is a square and the adjustments comprise resizing, rotating and repositioning the square.

16. The non-transitory computer-readable storage medium of claim 15, wherein the region selector is displayed at the estimated position within the second frame and the adjusting based on user input comprises the user dragging the region selector to the second user specified position.

17. The non-transitory computer-readable storage medium of claim 14, wherein the blending includes a forward blending and a backward blending, the forward blending comprises blending estimated positions for frames that occur after the second frame, and the backward blending comprising blending the estimated position for frames that occur before the second frame.

18. A system comprising:
   a memory; and a processing device communicably coupled to the memory, the processing device to execute instructions to:

identify a region in a first frame of a media item using a first user specified position;

calculate, based on the first user specified position and on tracking data, an estimated position of the region within a second frame of the media item and an estimated position of the region within a third frame of the media item;

adjust, based on user input, the estimated position of the region within the second frame to a second user specified position indicated by the user input;

blend, by a processing device, the estimated position within the third frame based on the second user specified position of the second frame to generate a blended position within the third frame; and modify the third frame to distort the region underlying the blended position.

19. The system of claim 18, wherein the processing device further to: provide a region selector to a user in response to a user request to distort a region, the region selector comprising a shape that can be adjusted by the user to surround the region, wherein the shape is a square and the adjustments comprise resizing, rotating and repositioning the square.

* * * * *